Figure 1:
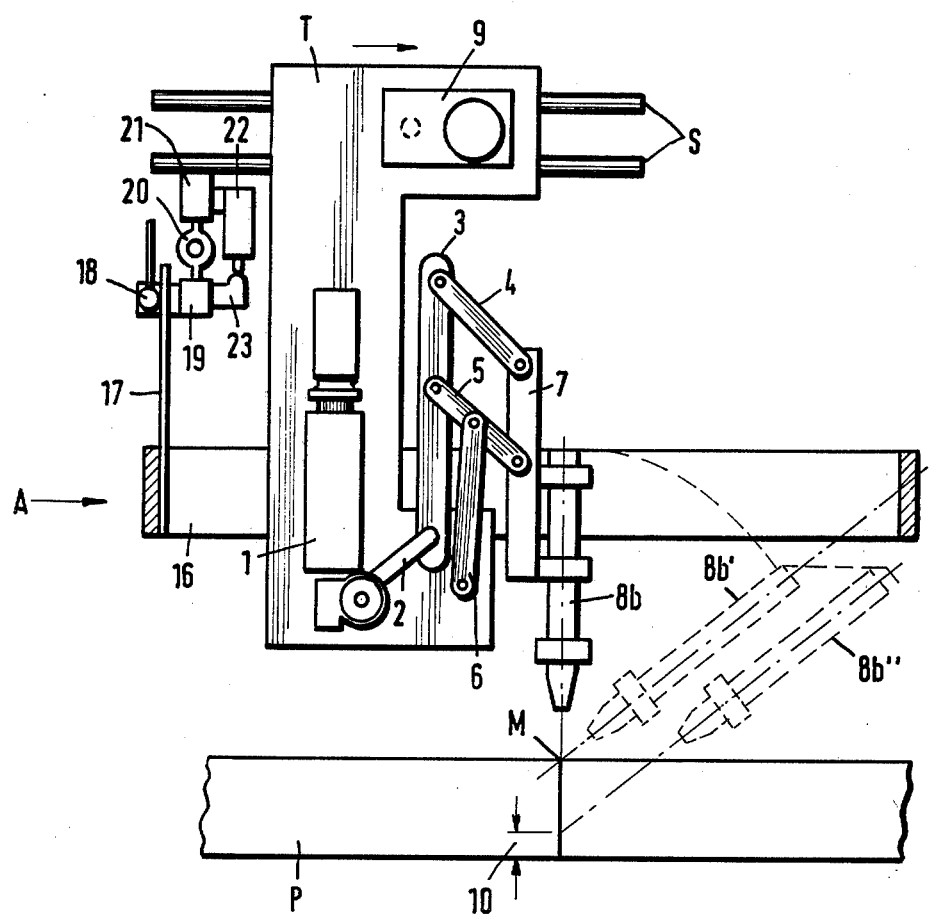

United States Patent [19]

Bräutigäm

[11] 4,179,101
[45] Dec. 18, 1979

[54] TWO TORCH HEAD FOR OXYGEN CUTTING MACHINES

[75] Inventor: Hans Bräutigam, Klein-Krotzenburg, Fed. Rep. of Germany

[73] Assignee: Esab-Kebe GmbH, Karben, Fed. Rep. of Germany

[21] Appl. No.: 868,144

[22] Filed: Jan. 9, 1978

[51] Int. Cl.² .............................................. B23K 7/10
[52] U.S. Cl. ......................................... 266/77; 83/58; 83/62; 266/63; 408/5; 408/6
[58] Field of Search ....................... 83/58, 62, DIG. 4; 266/62, 63, 77; 408/5, 6, 11, 13

[56] References Cited

U.S. PATENT DOCUMENTS

| | | | |
|---|---|---|---|
| 3,456,536 | 7/1969 | Daniels | 83/62 |
| 3,599,948 | 8/1971 | Bykov et al. | 266/77 X |
| 4,092,016 | 5/1978 | Roeder | 266/77 |

*Primary Examiner*—Paul A. Bell

[57] ABSTRACT

A torch head is provided for an oxygen-cutting torch machine comprising, in combination, a torch head; a first torch mounted on the torch head for cutting perpendicular cuts; and a second torch mounted on the torch head for cutting at an angle to the perpendicular; the mounting for the second torch having two parallel side shaft members and two parallel cross shaft members, each pivotably attached to the other at spaced locations so as to define a parallelogram swinging means in which the four members move pivotably and in parallel together; the second torch being pivotably mounted to one of the side members so that the second torch can be positioned at an angle to the perpendicular according to the relative movement of the parallelogram members; a reciprocably movable drive means mounted on the torch head for swinging the parallelogram swinging means; a shaft member rotatable about a point fixed to the torch head and having two spaced pivot mountings, one on each side of the fixed point, one pivot mounting being pivotably attached to the other of the side shaft members, and the other pivot mounting being pivotably attached to the reciprocable drive means, so that reciprocation of the drive means rotates the rotatable shaft member and thereby swings the parallelogram swinging means and the second torch means through a selected arc, and thus moves the second torch means into a selected angular cutting position.

11 Claims, 2 Drawing Figures

TWO TORCH HEAD FOR OXYGEN CUTTING MACHINES

It has already been known to provide three torch heads for phase cuts the middle torch of which cuts longitudinally while the two lateral torches are adjustable as to the angles thereof relative to the perpendicular. Extensive precision adjustment devices are necessary to bring about the adjustment of the individual torches and to safeguard at the same time that all three torches have the correct position relative to each other and hold it also during the cutting process.

The problem underlying the present invention is to so provide a head having only two torches, that welding edges may be cut with variable joint angles, as it is necessary that, after bending of the cut plates and the inclusion thereof into bigger structural parts, the same aperture angle of the welding joint be obtained in all places, and that, when a T-joint is made, the cut surface is exactly adapted to the structural portion to be welded on in order to make uniform fillet welds. In such cuts, however, additional problems might be encountered in that the cuts have to be made in a small distance only from perpendicularly welded-on bars, struts or the like, and that by a machine error, faulty programming or any other incidents the cutter head may get into contact with such an obstacle so that the torch adjustment may be altered or the torch head may even be damaged. In accordance with a preferred embodiment of the present invention, a possibility is described to overcome also such problems.

The main problem underlying the present invention is solved in a two torch head of the kind described above in that the second torch is pivotably supported by a parallelogram swinging means and together with this parallelogram swinging means is shiftably supported in the swinging plane thereof. In such a two torch head, swinging of the second torch is possible from the perpendicular position up to an angle exceeding 70° about a rotating point which, if said head is in a fixed position, is always on the same point of the upper surface of the plate to be cut. By shiftably arranging the rotating torch on its swinging plane, it is furthermore safeguarded that, independently from the angular position, a uniform depth of abutting gap faces is maintained during the cutting process.

A preferred embodiment of the invention is characterized in that a first motor drive for the pivotal movement of the swinging means and a second motor drive for the shifting movement are provided, and that the two drives are controlled by a computer. This makes possible the control of the two movements in accordance with a predetermined program. It is, furthermore, particularly useful that the two drives and the parallelogram swinging means carrying the second torch are supported on a common carrier shiftably provided in parallel to the swinging plane. By this arrangement, short drive paths and a stable geometric coordination of the parts is safeguarded.

In a further embodiment of the invention it is provided that a collision guard at least partly furnished around the two torch head is secured, via a vibration damper and height-adjustably, to said head and including a stop cooperating with a limit switch by means of which the machine may be stopped if an obstacle is contacted. By such a collision guard which may be provided as a sheet metal strip adapted to the contour of the head and wholly or partly surrounding it at a small distance, it is safeguarded that the torch adjustment is not inadvertently altered by the contact with an obstacle during the cutting process as only a light contact of the collision guard with such an obstacle will stop the cutting process and thus avoid negative effects on the head and the adjustment thereof.

Figure 2:
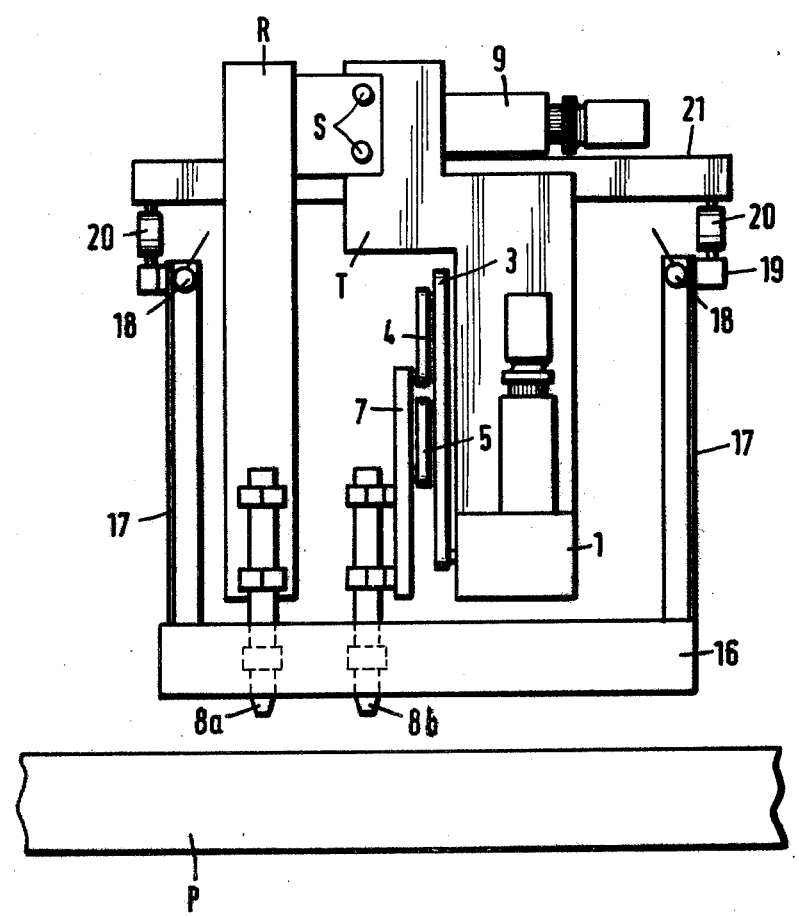

The invention will more readily be understood from the following description of an exemplified embodiment thereof with reference to the accompanying drawings in which FIG. 1 is a schematic view of a two torch head according to the invention seen in the cutting direction, FIG. 2 is the head of FIG. 1 shown in the direction of arrow A of FIG. 1.

The two torch head shown in the drawing is movably supported in a well known manner on a torch cutter support (not shown) via a frame portion R schematically indicated in the drawing which carries the fixed, or only vertically adjustable, respectively, first torch for perpendicular cuts. At right angles to the cutting direction, there are provided on frame R two horizontal parallel rails S along which a carrier, generally designated by T, for the second pivotable torch together with the portions assigned to it may be moved as will be described in detail in the following.

On carrier T, there is provided a first drive 1 comprising a motor including gear, and a second drive 9 comprising a motor including gear. Second drive 9 serves for moving carrier T along rails S.

First drive 1 is connected, via a schematically shown reduction gear, to horizontal shaft 2. To shaft 2, arm 3 is rigidly secured which is connected via two parallel levers 4 and 5 pivoted at a distance relative to each other on arm 3 to base plate 7 pivoted to the ends of the levers which constitutes, together with arm 3 and levers 4 and 5, a parallelogram guide. A push rod 6 pivoted to carrier T prevents a collaps of the parallelogram guide by pivotably engaging at about the middle of lever 5. Because arm 3 is pivotable together with the rotation of shaft 2, the whole parallelogram guide is considered, in the present, as a parallelogram swinging means.

The two torches are designated with the numerals 8a and 8b. While in FIG. 1 only the pivotable second torch 8b is visible through which, because of the perpendicular starting position according to FIG. 1, first torch 8a is covered, both torches 8a and 8b may be seen in FIG. 2.

On base plate 7, second torch 8b may height-adjustably be supported, as is well known, and for common pivotal movement together with base plate 7. The longitudinal axis of second torch 8b is directed to a point M on the upper surface of the plate P to be cut. By operating the parallelogram swinging means torch 8b may be pivoted about an angle from its perpendicular position into a new position as is for instance shown by dotted lines at 8b'. This movement is brought about by drive 1. Simultaneous operation of drive 9 moves carrier T along rails S, that is torch 8b is moved from position 8b' into position 8b''.

In detail, the swing of torch 8b is brought about via a rotation, controlled by a computer, of drive 1 by which shaft 2 and arm 3 are rotated about an arc which is equal to the desired arc about which torch 8b should be swung in order to get from the vertical position thereof into position 8b' shown by the dotted lines. The rotation of arm 3 is parallelly transferred to base plate 7 and thus to torch 8b. Simultaneously with drive 1, drive 9, too, is operated for shifting carrier T, also in a controlled way, so that the torch performs, in the course of the swinging movement, a lateral movement assigned to the corresponding swinging angle, i.e., a shift of the swinging plane. By this combined controlled movement, torch 8b is moved from the perpendicular position immediately into position 8b".

While the swinging movement determines the new direction of the longitudinal axis of the torch 8b, the "assigned" shift path takes care that the profile of the cut through plate P keeps the same depth of abutting gap faces which is indicated by 10 in FIG. 1. Independently from the size of the swinging angle, this depth is kept constant because each angle is assigned a predetermined shift path. In the course of the cutting process with the two torch head, the swinging angle may therefore constantly be changed so that in the later inclusion of a plate P so cut the same aperture angle of the welding joint is obtained while the depth abutting gap faces 10 is not altered.

Very often, plates have to be cut on which welded-on bars or other uprising fixed portions are provided. This constitutes a source of danger for the torch head, particularly for the sensitive adjustment mechanism of the swinging angle for torch 8b. Although collisions should be avoided by the program control of the cutting process, they might nevertheless occur as a consequence of machine errors or computing errors. Even a light bump against torch 8b would be transferred via its base plate 7 onto the parallelogram swinging means and could cause a permanent change of the angular position which even if corrected would nullify the necessary coordination between angular and shift path or make it at least much more difficult.

In order to prevent such disturbances, a collision guard has been provided on the two torch head. Substantially, it comprises a metal sheet strip 16 adapted to the contour of the head and wholly or partly encompassing it. The width of the strip 16, i.e., its vertical dimension, is not critical. It is height-adjustable via three angular bars 17, which carry it and which are secured by eccentric levers 18 to frame 19 at the desired height. Frame 19 is suspended, under intercalation of vibration dampers 20, on the head, for instance on frame R. On the suspension means designated by 21, limit switches 22 are provided which are operated by adjustable stops, preferably having the shape of cams 23, depending on the relative movement of stops 23 against limit switches 22 caused by bumps against metal sheet strip 16. By the contact so obtained, the whole machine is stopped, by the electronic control, prior to a collision with the two torch head. It is evident that such collision guard may also advantageously be employed in torch heads other than the two torch head according to this invention.

I claim:

1. A torch head for an oxygen-cutting torch machine comprising, in combination, a torch head; a first torch mounted on the torch head for cutting perpendicular cuts; a second torch mounted on the torch head for cutting at an angle to the perpendicular; the mounting for the second torch having two parallel side shaft members and two parallel cross shaft members, each pivotably attached to the other at spaced locations so as to define a parallelogram swinging means in which the four members move pivotably and in parallel together; the second torch being mounted to one of the side shaft members so that the second torch can be positioned according to the cutting requirement at any preselected angle to the perpendicular according to the relative movement of the parallelogram members; a drive means mounted on the torch head for swinging the parallelogram swinging means; a shaft member rotatable about a point fixed to the torch head and having two spaced pivot mountings, one on each side of the fixed point, one pivot mounting being pivotably attached to the other of the side shaft members, and the other pivot mounting being pivotably attached to the drive means, a supporting shaft member having two spaced pivot mountings, one pivot mounting being pivotably attached to the torch head, and the other pivot mounting being pivotably attached to one of the cross shaft members at about the midway point between the two shaft members, thereby supporting the parallelogram swinging means against collapse; so that operation of the drive means rotates the rotatable shaft member and thereby swings the parallelogram swinging means and the second torch means through a selected arc, and thus moves the second torch means into a selected angular cutting position.

2. A torch head in accordance with claim 1, in which, in addition, the drive means and the parallelogram swinging means are each also movable together in a second plane parallel to the plane in which the parallel swinging means can be swung.

3. A torch head in accordance with claim 2 comprising a second drive means for moving the drive means and the parallelogram swinging means along the second plane.

4. A torch head in accordance with claim 1 comprising a collision guard extending protectively about the torch head; a vibration damper attached at one end to the head, and at another end to the collision guard; and means attached to the collision guard for stopping the cutting when the guard is struck and the vibration damper moved a predetermined distance with respect to the head.

5. A torch head in accordance with claim 1 in which the drive means comprises a motor operating a gear operatively connected with the rotatable shaft member.

6. A torch head for an oxygen-cutting torch machine comprising, in combination, a torch head; a first torch mounted on the torch head for cutting perpendicular cuts; a second torch mounted on the torch head for cutting at an angle to the perpendicular; the mounting for the second torch having two parallel side shaft members and two parallel cross shaft members, each pivotably attached to the other at spaced locations so as to define a parallelogram swinging means in which the four members move pivotably and in parallel together; the second torch being mounted to one of the side shaft members so that the second torch can be positioned according to the cutting requirement at any preselected angle to the perpendicular according to the relative movement of the parallelogram members; a shaft member rotatable about a point fixed to the torch head and having two spaced pivot mountings, one on each side of the fixed point, one pivot mounting being pivotably attached to the other of the side shaft members, and the other pivot mounting being pivotably attached to the reciprocable drive means; a supporting shaft member having two spaced pivot mountings, one pivot mounting being pivotably attached to the torch head, and the other pivot mounting being pivotably attached to one of the cross shaft members at about the midway point between the two shaft members, thereby supporting the parallelogram swinging means against collapse; so that rotation of the rotatable shaft member swings the parallelogram swinging means and the second torch means through a selected arc, and thus moves the second torch means into a selected angular cutting position, while the supporting shaft member swings with the cross shaft member to which it is pivotably attached without restriction of the arc through which the parallelogram swinging means swings.

7. A torch head in accordance with claim 6 in which, in addition, the drive means and the parallelogram swinging means are each also movable together in a second plane parallel to the plane in which the parallel swinging means can be swung.

8. A torch head in accordance with claim 6 comprising a second drive means for moving the first drive means and the parallelogram swinging means along the second plane.

9. A torch head in accordance with claim 6 comprising a collision guard extending protectively about the torch head; a vibration damper attached at one end to the head, and at another end to the collision guard; and means attached to the collision guard for stopping the cutting when the guard is struck and the vibration damper moved a predetermined distance with respect to the head.

10. A torch head in accordance with claim 6 including a drive means mounted on the torch head for rotating the rotatable shaft member.

11. A torch head in accordance with claim 10 in which the drive means comprises a motor operating a gear operatively connected with the rotatable shaft member.

* * * * *